Sept. 27, 1960 S. K. GHANDHI 2,954,476

PHOTO-ELECTRONIC NETWORK

Filed Nov. 3, 1958

INVENTOR:
SORAB K. GHANDHI,

BY Richard V. Lang

HIS ATTORNEY.

United States Patent Office 2,954,476

Patented Sept. 27, 1960

2,954,476

PHOTO-ELECTRONIC NETWORK

Sorab K. Ghandhi, Syracuse, N.Y., assignor to General Electric Company, a New York corporation Filed Nov. 3, 1958, Ser. No. 771,525

7 Claims. (Cl. 250—209)

The present invention relates to circuits employing photo-electronic devices and has as a particular object thereof the provision of novel circuit configurations greatly enhancing the response times of such circuits.

The term "photo-electronic devices" is herein used to designate devices wherein an electrical property of a material is influence by radiation in the visual or near visual region or an optical property in the form of radiation in the visual or near visual region is influenced by electrical quantities. Two very common examples of photo-electronic devices are photoconductive cells and electroluminescent cells.

The photoconductive cells when subjected to radiation in the visual or near visual region experience a change in resistivity. In the dark such cells have extremely high resistances, usually measured in hundreds of megohms. In bright light, these resistances fall to low values approaching those of metallic conductors. The mechanism by which this conduction occurs is explained as arising from charge carriers created by inelastic photon collisions within the material. The phenomenon may be enhanced by secondarily created carriers if an appropriate activating material is employed. Materials which exhibit the photoconduction property to a marked degree include cadmium sulfide and cadmium selenide. It should be recognized, however, that most insulating materials tend to exhibit this property to a certain extent, and that there are many materials which may be used in practical devices.

The electroluminescent cells produce light radiation upon subjection of the cells to high intensity electrical fields. The mechanism by which this occurs generally presupposes an electroluminescent material having an activator providing electrons whose energy level is near, e.g. within two electron volts, that of the conduction band. In the presence of a strong electrical field these electrons are elevated to the conduction band. Recombinations and inelastic collisions involving these electrons then give rise to the observed light radiation. The class of materials most commonly employed are crystalline phosphors activated by metallic materials. An example is copper activated zinc sulphide.

The foregoing photoconductive and electroluminescent devices may be characterized by very small size, high sensitivity, and low power requirements; these features together with their adaptability to construction by printed circuit techniques highly commends them to uses where miniturization is desired. Since the devices, considered as elements, are of intrinsically simple and small physical structure, one may use large numbers of these elements in computer applications without prohibitive size or complexity. To their detriment, it must be recognized that the speed of response of these elements in conventional circuits, is somewhat less than is usually desired. One object of the present invention is to provide a novel circuit arrangement employing photo-electronic elements wherein the speed of circuit response is improved.

It is a further object of the present invention to provide new and improved circuits incorporating electroluminescent and photoconductive elements.

It is still another object of the present invention to provide a new and improved pulse transmission circuit incorporating electroluminescent and photoconductive elements.

It is a further object of the present invention to provide new and improved logic circuits, as for example those expressing negation (inhibit), conjunction (and) or disjunction (or) incorporating electroluminescent and photoconductive elements.

Applicant has recognized that the rate of operation of these elements is relatively fast in certain portions of the operating characteristic and relatively slow in other portions of the operating characteristic. In particular, in the typical electroluminescent cell photoconductive cell combination, the response time of the electroluminescent cell to energization and de-energization is quite fast, often permitting switching at a rate of 100,000 cycles per second. On the other hand, while the response time of photoconductive cell to initiation of light is quite rapid, on the order of a millisecond or less, its response to extinction of light, while initially quite fast, has an extremely slow final recovery rate. These devices in ordinary circuits may usually only be switched at very slow rates of from many seconds or even minutes per cycle to perhaps several cycles per second, depending on the materials and configuration.

In accordance with the present invention, applicant has provided a novel light pulse responsive circuit incorporating electroluminescent cells and photoconductive cells, wherein the rapidity of response of the circuit is not retarded by the slow final recovery rate of the photoconductors which are employed. One embodiment of the present invention takes the form of a first photoconductive cell, to which the input light impulses are applied, electrically connected in series with a first electroluminescent cell across a source of alternating potentials. The light pulse output is derived from the first electroluminescent cell. There is also provided, in accordance with the invention, a second electroluminescent cell and a second photoconductor, optically coupled to one another, and electrically connected in series between the terminals of said source in order reversed to that of the first photoconductive cell and first electroluminescent cell. Finally, the junction of the first photoconductive cell with the first electroluminescent cell and the junction of the second electroluminescent cell and the second photoconductive cell are electrically connected together. By these measures, the operation of the composite circuit is made independent of the final slow recovery rate of the first photoconductive cell, and in fact extinction of the output indication at the output electroluminescent cell occurs early in the rapid recovery portion of the photoconductive cell characteristic. The foregoing inventive concept is applied in accordance with further aspects of the invention in circuits performing pulse transmission, pulse negation, pulse conjunction and pulse disjunction. The foregoing measures lead to marked improvement in circuit response times, permitting improvements in certain cases of as great as two orders of magnitude.

Figure 1 is a first embodiment of the invention providing the function of light pulse transmission;

Figure 2*a* is a graph illustrating the operation of a conventional pulse transmission network absent the specific measures suggested by applicant, and Figure 2*b* is a second graph illustrating the typical recovery characteristics of a photoconductive element such as is employed in applicant's circuit configurations;

Figure 1:
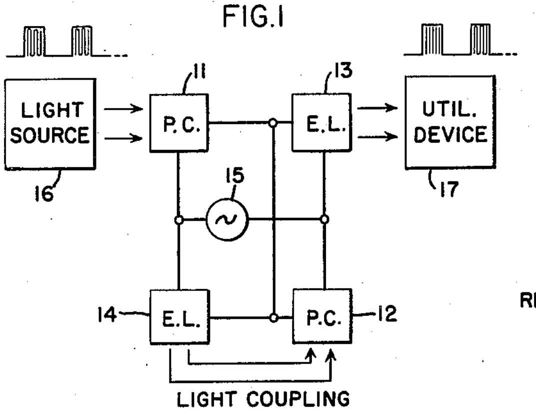

Referring now to Figure 1 there is shown a first embodiment of the invention adapted for transmission of light pulses, typically in the form of modulated pulses of light having a pulse repetition rate of from 20 to 100 cycles per second and a carrier frequency of several kilocycles. This embodiment comprises a pair of photoconductive cells 11 and 12, a pair of electroluminescent cells 13 and 14 and an energizing source 15 of alternating potential usually having a frequency of several kilocycles. A source of modulated light pulses 16 is shown associated with one of the photoconductive cells and a utilization device 17 for the output light pulses is shown associated with another of the electroluminescent cells. The photoconductive cell 11 and the photoconductive cell 12 are each provided with a pair of electrical terminals and an optical input surface. The electroluminescent cells 13 and 14 are similarly provided with a pair of electrical energizing terminals and an optical output surface.

The optical and electrical paths of the pulse transmission circuit are arranged in the following manner. The source of light input pulses 16 is optically coupled to the optical input surface of the photoconductive cell 11. The electrical terminals of the photoconductive cell 11 are electrically connected in series with the electrical terminals of the electroluminescent cell 13 across the output terminals of the alternating current source 15. The optical output surface of the electroluminescent cell 13 is optically coupled to the light pulse utilization device 17. The electroluminescent cell 14 and the photoconductive cell 12 have their electrical terminals connected in series across the output terminals of the alternating current source 15, and are additionally optically coupled with the light output surface of the electroluminescent cell 14 arranged to transmit light to the optical input surface of the photoconductive cell 12. Finally the point of interconnection between the first photoconductive cell 11 and the first electroluminescent cell 13 and the point of interconnection between the second electroluminescent cell 14 and the second photoconducting cell 12 are electrically joined.

The elements 16, 11, 13, 15, and 17 form an essentially conventional light amplification or transmission network. A light pulse shining from the light input 16 illuminates the optical input surface of the photoconductive cell. This causes the resistance of the photoconductive cell to fall rather rapidly (the conductivity to rise sharply) causing the voltage at the electrical terminals of the electroluminescent cell also to rise sharply. This is due to the series connection of the photoconductive cell 11 and electroluminescent cell 13 across the source 15, by which a decrease in resistance of the cell 11 causes a larger portion of the source voltage to be applied across the terminals of the electroluminescent cell 13. Since the dark resistance of the photoconductive cell can be extremely high compared to the resistance of the photoconductive cell in the presence of illumination, the voltage at the terminals of the electroluminescent cell is thus varied from a low value, a very small fraction of the source voltage, to a high value approaching that of the source voltage. The electroluminescent cell on the other hand while not having a true threshold value has a strongly non-linear characteristic that is of fast operation. The source voltage now being almost fully applied to the electroluminescent cell, causes it to shine brightly, thus delivering a light pulse whose carrier is of source frequency to the pulse utilization device 17.

Figure 2A:
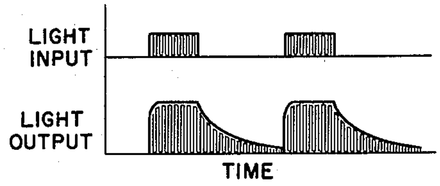
Figure 2B:
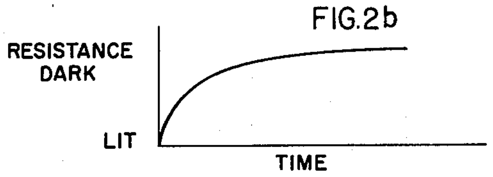

The foregoing elements 16, 11, 13, 15 and 17 provide a pulse transmission network which may be described as having a relatively fast initial response, but a poor recovery rate, greatly restricting the rate at which pulses may be transmitted. Figure 2(*a*) shows the output of such a network under the influence of rectangular input pulses. The reason for this poor recovery rate may be attributed to the decay time of the photoconductor element. Figure 2(*b*) illustrates the resistivity of a conventional photoconductor as a function of time after discontinuance of a light input. It may be seen that the return to low conductivity, while initialy quite rapid, slows down progressively, making the final return to low conductivity very gradual. The steeply rising leading edges of the output pulses indicate a much more rapid response in the photoconductor to the initiation of light pulses. The response of the electroluminescent cell to energization and de-engization is fast, involving negligible delays in comparison to the delays involved in making the photocell conductive or returning it to a non-conductive state.

The elements 12 and 14 in combination with the elements 16, 11, 13, 15 and 17 provide a novel pulse transmission network wherein the time delay effects of the photoconductive elements are largely eliminated, whereby an order or two of magnitude of improvement in repetition rate is achieved.

Let us now consider the starting and running operation of the complete circuit. At the moment of energization of the source 15 a voltage is applied across the four arm bridge comprising the elements 11, 12, 13 and 14. Assuming darkness, the photocells 11 and 12 are in their high resistance condition forbidding current flow in their series paths. The electroluminescent cells thus each have approximately one half of the source voltage across their respective terminals, and since this voltage is selected to be quite high, both cells tend to glow slightly. The cell 14 is optically coupled to the photoconductive cell 12, and accordingly, the initial light intensity is made sufficient to achieve a substantial reduction in impedance of the photoconductive cell 12. Each reduction in impedance in the cell 12 brings about a cumulative increase in illumination of the electroluminescent cell 14. In a short time, the photoconductive cell 12 becomes fully conductive, thereby shorting out the electroluminescent cell 13 and extinguishing it and applying substantially full source potential to the radiantly coupled electroluminescent cell 14. At this moment, the cell is in operating readiness and ready for input signals.

The energization requirements of the electroluminescent cell should perhaps be considered at this point in the discussion. In general, the maximum energization potential depends upon the thickness of the material, which when on the order of two or three mils is about three hundred volts. The operating frequency of the electroluminescent cell is made high so as to result in improved light generating efficiency. The luminosity of electroluminescent cells rises rapidly, usually between a third to fifth power of the applied voltage.

The photoconductive cells are selected with respect to the electroluminescent cells to provide adequate current conduction to permit operation of the electroluminescent cells through several orders of intensity to their maximum brightness. Their operating frequency is usually selected as low as possible so as to reduce the effects of shunting capacitance inherent in the cell. In circuits using photoconductive cells ranging in area from 0.02 square inches to one square inch a supply frequency of 5000 cycles or so is suitable. In practice one may make tiny composite units wherein both electroluminescent and photoconductor cells are of approximately the same size.

It may also be observed with respect to the nature of the light input and output pulses, that a very convenient input source may be an electrically energized electroluminescent cell. Thus, in the interests of efficiency of the input device, the input pulse may be of the modulated pulse variety having a carrier frequency measured in kilocycles selected to provide optimum functioning of the input device. The pulse repetition rate would of course be selected to correspond to the response of the composite circuit. The pulse output of the network is of the frequency of the source 15. One may wish, however, to use an unmodulated input pulse of light, and this will of course provide equally efficient operation of the network, since the changes in conductivity of the input photoconductor are usually so slow as to completely mask the modulated carrier. The output light under these conditions will of course still be modulated.

Let us now return to a discussion of the operation of the complete circuit of Figure 1, entering now into a consideration of the running operation of the circuit, assuming that the circuit is in operating condition. At the onset of an input light pulse, the photoconductive cell 11, in dark-high resistance condition is turned on quickly and converted to a low resistance condition. This turns on the series coupled electroluminescent cell 13 causing a light output at the utilization device 17. The advent of high conductivity on the part of the photocell, 11, has a second effect of short circuiting the electroluminescent cell 14, thus reducing its terminal voltage to below glowing potential, and causing the photoconductor 12 to become darkened. The photoconductor 12 thus enters its decay characteristic returning to a high resistance condition, but if the duration of the pulse is short, the recovery will not be complete. Since the recovery rate follows an exponential type of curve, with a high initial rate, and slower subsequent rate, a large change in resistance magnitude will occur in the photoconductor 12, even with pulses of moderately short duration.

Thus we have a condition at the termination of a short input pulse in which the resistance of the photocell 11 in shunt with the electroluminescent cell 14 is increasing rapidly, while the resistance of the photocell 12, in series with the electroluminescent cell 14 has reached a moderately high value and is increasing at a less rapid rate. This former condition permits the electroluminescent cell 14 to derive an appreciable fraction of the source voltage, causing it to glow and soon to fire under the regenerative effect of the photoconductor 12. The increased conductivity of the photoconductor 12 in shunt with the output electroluminescent cell 13, quickly reduces its terminal voltage and cuts it off with rapidity to terminate the output pulse.

The foregoing network has the facility of greatly increasing the speed of operation of the light pulse transmission circuit. It minimizes the slowing effect produced by the slow exponential return of a photoconductor to the high resistance dark state by using only the initial portion of the recovery rate, where the rate of change of resistance is greatest, to permit early firing of the auxiliary electroluminescent cell, which then hastens the extinction of the output electroluminescent cell, by illuminating the shunting photoconductor. Thus applicant's regenerative network has permitted one to utilize to advantage the initial portion of the increase in resistance of the photocell upon darkening which is relatively fast, and the fast decrease in resistance of the photocell upon illumination, without having to use the long slow portion of the recovery characteristic of the photoconductor required to restore the photoconductor to near perfect insulation.

Figure 3:
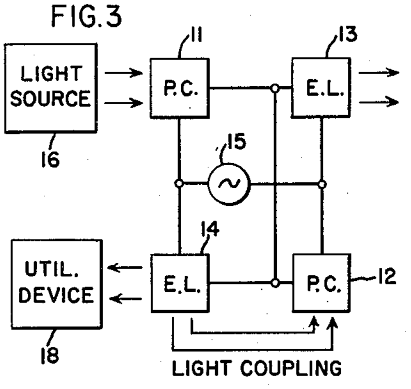
Figure 3 is a second embodiment of the invention providing an output indication during the absence of an input pulse or pulse negation.

The present invention finds practical application in several kinds of logic networks involving photoconductors and electroluminescent cells. One application of the invention is shown in Figure 3. In this second embodiment, a network expressing negation of the presence of a pulse at the input terminals is shown. It comprises the elements 11 through 16 connected and arranged substantially as in the first embodiment. A light output pulse utilization device 18 is connected, in this embodiment, to the electroluminescent cell 14 rather than to the electroluminescent cell 13. One could of course employ output connections to both electroluminescent cells simultaneously. The circuit is otherwise of the same configuration and adjustment as before. As indicated in the functional description of the first embodiment, the cell 14 is lighted during periods of non-pulse transmission and unlighted during periods of pulse transmission, with the exception of the period during switching transients during which both electroluminescent cells may be in a partially lighted condition. The output at the electroluminescent cell 18 thus denotes negation of a signal applied to the input.

One may with somewhat less convenience substitute a capacitor for the electroluminescent cell 13, if an optical output is not desired therefrom. Since the capacitor should simulate the changing power factor of the cell 13, it is usually preferable to use instead a regular electroluminescent cell.

Figure 4:
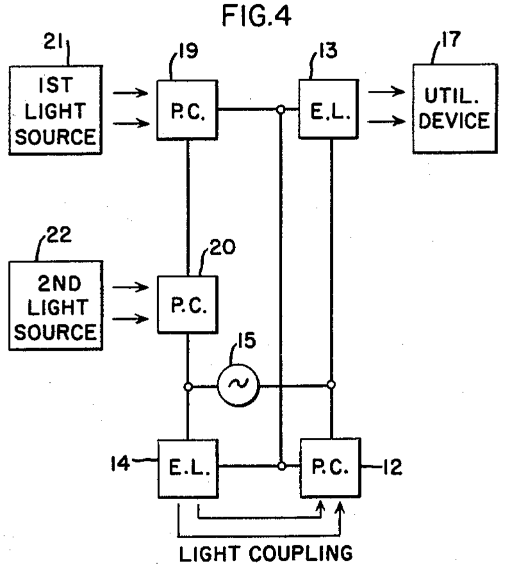
Figure 4 is a third embodiment of the present invention providing the logic function of indicating input pulse conjunction.

One may also employ the invention in the logic function of providing an indication of conjunction of a pair or more of input pulses. The circuit for performing this function with respect to a pair of pulses is illustrated in Figure 4. It takes the general form of the circuit shown in Figure 1, being specifically modified by the substitution of a pair of photoconductive cells 19 and 20, each respectively coupled to separate light input sources 21 and 22 for the single photoconductor 11 and single light input source 16. The remaining elements of the configuration (elements 12, 13, 14 and 15 and 17) are as before. As illustrated in Figure 4 the photoconductor 19 and the photoconductor 20 are electrically connected in series between the points to which the photoconductor cell 11 was connected in the embodiment shown in Figure 1. The first light input source 21 is radiantly coupled to the photoconductor 19 and the second light input source 22 is radiantly coupled to the photoconductive cell 20. By this configuration, irradiation of the photoconductor 19 from the first light source 20 brings about a reduction in the resistance of the photoconductive cell 19, but it will have no net effect upon the complete circuit because of the high resistance condition of the photoconductive cell 20 in series therewith. When both photoconductive cells 19 and 20 are illuminated, then the resistances of both elements fall, causing the resistance in their branch to fall to a low value permitting operation of the circuit as earlier explained to produce an output light pulse.

Figure 5:
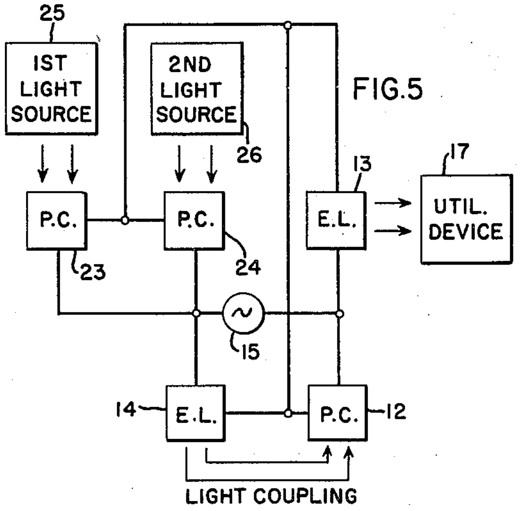
Figure 5 is a fourth embodiment of the present invention performing the logic function of indicating input pulse disjunction.

The invention may also be employed in a logic function of providing an indication of disjunction between the pair or more of input pulses. The circuit for performing this function between a pair of pulses is shown in Figure 5. It takes the general form of the circuits shown in Figure 1, being specifically modified by the substitution for the single input photoconductive cell 11 and associated light input source 16, of a pair of photoconductive cells 23 and 24 and a pair of light input sources 25 and 26. The other components of the circuit (elements 12, 13, 14, 15 and 17) are as before. The photoconductive cell 23 and the photoconductive cell 24 are electrically connected in parallel between the terminals corresponding to which the photoconductor 11 was connected in the embodiment shown in Figure 1. The first light input source 25 is radiantly coupled to the photoconductive cell 23 and the second light input source 26 is radiantly coupled to the photoconductive cell 24. Upon the occurrence of an output pulse or wave train at the light input source 25, lighting the first photoconductor 23, the conditions are established for creating a light output pulse to be delivered to the light output source 17. Similarly an input provided by the second light input source 26 and coupled to the photoconductor 24 will bring about an output indication at the utilization device 17. In like manner a larger number of light input elements each associated with parallelled photoconductive elements may be connected to the network, and an output indicative of a signal on any one or all of them may be derived at the output 17.

In general, the examples which have been given of photoconductive devices and electroluminescent cells, do not represent the best obtainable. The examples have been selected to illustrate the marked improvement which applicant's novel circuit configuration brings about. In general corresponding improvements may be obtained with better photoelectronic components.

While particular applications of the invention have been shown, it may be observed that the invention is of very general application in the general field of digital computation. In general, the initial branch of the circuit, into which in Figure 1 the photoconductor 11 is connected, may be replaced by a network of photoconductive elements in optically coupled relationship with one or more electroluminescent cells. The logical function performed by this network is the same as that performed by the entire circuit, with the advantage that the speed of response is greatly enhanced.

The foregoing circuitry may be directly applied in other computer devices such as half-adders, even parity checkers, or shift registers.

While particular embodiments of the invention have been shown and described, it should be understood that the invention is not limited thereto and it is intended in the appended claims to claim all such variations as fall in the true spirit of the present invention.

What I claim as new and desire to secure by Letters Patent of the United States is:

1. A signal responsive network having four branches electrically connected in closed loop sequence, the junction of the first and fourth branches and the junction of the second and third branches being coupled to a source of alternating potentials for energization of said network and the junction of the first and second branches and the junction of the third and fourth branches being electrically connected together through a low impedance path, said first branch comprising at least one photoconductive element, said second, third and fourth consecutively connected branches respectively consisting of an electroluminescent cell optically isolated from elements in said first branch, a photoconductor, and an electroluminescent cell optically coupled to said last recited photoconductor, means for coupling input light signal pulses to the photoconductive elements in said first branch, and means optically coupled to at least one of said electroluminescent cells for deriving a signal output from said network.

2. The combination set forth in claim 1 wherein said means for deriving a signal output is coupled to said electroluminescent cell in said second branch.

3. A signal responsive network comprising a first photoconductor and a first electroluminescent cell mutually optically isolated and electrically connected in series, energizing means for said network connected across said series circuit, means for applying an input optical signal to said photoconductor, a second electroluminescent cell connected in shunt with said photoconductor, a second photoconductor connected in shunt with said first electroluminescent cell, said second photoconductive cell being in optically coupled relationship with respect to said second electroluminescent cell, and means for deriving an output optical signal from one of said electroluminescent cells.

4. The combination set forth in claim 3 wherein said output signal deriving means are coupled to said second electroluminescent cell.

5. A signal responsive network comprising a first photoconductor and a first electroluminescent cell mutually optically isolated and electrically connected in series, energizing means for said network connected across said series circuit, means for applying an input optical signal to said photoconductor, means for deriving an output optical signal from said electroluminescent cell, a second electroluminescent cell connected in shunt with said first photoconductor, a second photoconductor connected in shunt with said first electroluminescent cell, said second photoconductive cell being in optically coupled relationship with respect to said second electroluminescent cell.

6. A signal responsive network comprising a first and a second photoconductor and a first electroluminescent cell, mutually optically isolated from said photoconductors, said three elements being electrically connected in series, energizing means for said network connected across said series circuit, means for applying a first input optical signal to said first photoconductor, means for applying a second input optical signal to said second photoconductor, a second electroluminescent cell connected in shunt across the series circuit formed by said first and second photoconductors, a third photoconductor connected in shunt with said first electroluminescent cell, said third photoconductive cell being in optically coupled relationship with respect to said second electroluminescent cell, means for deriving an output optical signal coupled to said first electroluminescent cell.

7. A signal responsive network comprising a first and a second photoconductor coupled in shunt with one another and a first electroluminescent cell mutually optically isolated from said photoconductors and electrically connected in series with the shunt circuit formed by said photoconductors, energizing means for said network connected across the series circuit formed by said photoconductors and said first electroluminescent cell, means for applying a first input optical signal to said first photoconductor, means for applying a second input optical signal to said second photoconductor, a second electroluminescent cell connected in shunt with said photoconductors, a third photoconductor connected in shunt with said first electroluminescent cell, said third photoconductive cell being in optically coupled relationship with respect to said second electroluminescent cell, and means for deriving an output optical signal from said first electroluminescent cell.

References Cited in the file of this patent

Loebner: Optic-Electronic Devices and Networks. Proceedings of the IRE, December 1955, vol. 43, No. 12, pp. 1897–1906, Fig. 14.